US009541387B2

(12) United States Patent
Lane

(10) Patent No.: US 9,541,387 B2
(45) Date of Patent: Jan. 10, 2017

(54) PASSIVE ALTIMETER

(71) Applicant: Goodrich Corporation, Charlotte, NC (US)

(72) Inventor: Richard N. Lane, Westford, MA (US)

(73) Assignee: Goodrich Corporation, Charlotte, NC (US)

(*) Notice: Subject to any disclaimer, the term of this patent is extended or adjusted under 35 U.S.C. 154(b) by 440 days.

(21) Appl. No.: 14/175,126

(22) Filed: Feb. 7, 2014

(65) Prior Publication Data

US 2015/0226551 A1   Aug. 13, 2015

(51) Int. Cl.
| | |
|---|---|
| *H04N 7/18* | (2006.01) |
| *G06K 9/00* | (2006.01) |
| *G01C 5/00* | (2006.01) |
| *G01C 11/06* | (2006.01) |
| *G01C 23/00* | (2006.01) |
| *H04N 13/02* | (2006.01) |
| *B64D 47/08* | (2006.01) |
| *G01C 21/10* | (2006.01) |
| *G01C 21/20* | (2006.01) |

(52) U.S. Cl.
CPC .............. *G01C 5/005* (2013.01); *B64D 47/08* (2013.01); *G01C 11/06* (2013.01); *G01C 21/10* (2013.01); *G01C 21/20* (2013.01); *G01C 23/00* (2013.01); *H04N 13/0221* (2013.01)

(58) Field of Classification Search
None
See application file for complete search history.

(56) References Cited

U.S. PATENT DOCUMENTS

| 4,828,382 A | 5/1989 | Vermilion | |
|---|---|---|---|
| 5,072,396 A * | 12/1991 | Fitzpatrick | G09B 9/24 348/116 |
| 6,256,559 B1 | 7/2001 | Tsui | |
| 6,694,228 B2 * | 2/2004 | Rios | G05D 1/0094 244/17.13 |
| 7,151,999 B2 | 12/2006 | Neregard | |
| 7,400,950 B2 * | 7/2008 | Reich | A63H 27/04 701/3 |

(Continued)

FOREIGN PATENT DOCUMENTS

| EP | 1584896 A1 | 10/2005 | |
|---|---|---|---|
| EP | 2472221 A1 | 7/2012 | |
| JP | EP 2472221 A1 * | 7/2012 | ............. G01C 11/04 |

OTHER PUBLICATIONS

European Extended Search Report dated Jun. 22, 2015, issued on corresponding European Patent Application No. 15154361.8.

*Primary Examiner* — Joseph Ustaris
*Assistant Examiner* — Rebecca Volentine
(74) *Attorney, Agent, or Firm* — Locke Lord LLP; Scott D. Wofsy; Daniel J. Fiorello

(57) ABSTRACT

A passive altimeter includes an imaging device, a groundspeed system, an image processing device operatively connected to receive an indication of groundspeed from the groundspeed system and to receive at least a first image from the imaging device taken at a first position and a second image from the imaging device taken at a second position spaced apart from the first position. The image processing device is configured to compare the first image and the second image to determine an altitude above ground using the indication of groundspeed from the groundspeed system.

6 Claims, 3 Drawing Sheets

(56) References Cited

U.S. PATENT DOCUMENTS

| | | | |
|---|---|---|---|
| 7,408,629 B2 | 8/2008 | Qwarfort et al. | |
| 8,548,194 B1* | 10/2013 | Lyon | G01O 5/005 |
| | | | 382/103 |
| 2003/0118213 A1* | 6/2003 | Parker | G01O 5/005 |
| | | | 382/106 |
| 2004/0252881 A1* | 12/2004 | Levin | G01C 11/06 |
| | | | 382/154 |
| 2005/0125142 A1* | 6/2005 | Yamane | G01C 11/00 |
| | | | 701/510 |
| 2005/0273259 A1* | 12/2005 | Qwarfort | G01C 11/06 |
| | | | 701/301 |
| 2006/0149458 A1* | 7/2006 | Costello | G01C 21/005 |
| | | | 701/438 |
| 2009/0003654 A1* | 1/2009 | Laughlin | G01C 3/18 |
| | | | 382/106 |
| 2011/0166722 A1* | 7/2011 | Lee | G01O 5/005 |
| | | | 701/4 |
| 2013/0093880 A1* | 4/2013 | Mellor | G01C 11/02 |
| | | | 348/135 |

* cited by examiner

PASSIVE ALTIMETER

BACKGROUND

1. Field

The present disclosure relates to altimeters, and more particularly to altimeter systems for determining altitude above the ground level.

2. Description of Related Art

Altitude above ground level (AGL) is an important consideration for all aspects of flight. For example, during critical phases of flight, many systems may need an indication of AGL altitude to perform properly. One way to determine altitude AGL is to use active radar altimeters which send a radar signal to the ground. Such conventional methods and systems have generally been considered satisfactory for their intended purpose. However, conventional AGL signals can potentially be distorted, intercepted, or the like, and may be inaccurate. As a result, there is still a need in the art for improved AGL altimeters. The present disclosure provides a solution for this need.

SUMMARY

In at least one aspect of this disclosure, a passive altimeter includes an imaging device, a groundspeed system, an image processing device operatively connected to receive an indication of groundspeed from the groundspeed system and to receive at least a first image from the imaging device taken at a first position and a second image from the imaging device taken at a second position spaced apart from the first position. The image processing device is configured to compare the first image and the second image to determine an altitude above ground using the indication of groundspeed from the groundspeed system.

The image processing device can be further configured to determine a location of at least one common pixel on the first image and the second image. In some embodiments, the image processing device can be configured to compare a relative change in position of the at least one common pixel between the first image and the second image.

The image processing device can be configured to determine a Nadir angle of the imaging device relative to ground. The imaging device can also be gyroscopically stable to maintain a predetermined minimum Nadir angle relative to ground. The image processing device can also be configured to determine altitude based on a Nadir angle of zero for the imaging device. In some embodiments, the imaging device can include at least one of a visual camera and/or an infrared camera.

The groundspeed indicator can include a global position sensor (GPS) and an aircraft inertial measurement unit. The GPS and the aircraft inertial measurement unit can be operatively connected to the image processing device to provide data thereto.

In at least one aspect of this disclosure, a method for passively determining altitude includes receiving, at an image processing device, a first image from an imaging device, the imaging device having a known instantaneous field of view (IFOV), receiving, at the image processing device, a second image from the imaging device, receiving a groundspeed indication from a groundspeed system that is configured to determine a groundspeed (GS) of an aircraft, determining a $\Delta t$ as a difference in time between the first image and the second image, selecting at least one common pixel of the first image and the second image, determining a relative change in position of the at least one common pixel between the first image and the second image to determine an image distance (ID), and calculating altitude above ground level (AGL) above a portion of a surface depicted by the at least one common pixel using the following relationship: $AGL=[(GS*\Delta t)/(IFOV*ID)]*\cos(\theta)$, where $\theta$ is Nadir angle.

Calculating altitude AGL can include determining the Nadir angle with the image processing device. In some embodiments, calculating altitude AGL can include assuming the Nadir angle is zero. Determining the $\Delta t$ can include receiving the $\Delta t$ as predetermined value selected by a user.

The at least one common pixel can further include a first common pixel depicting a portion of a structure and a second common pixel depicting a portion of ground, and the method can further include determining the altitude of a structure relative to ground that is depicted in the first and second images by determining a difference in altitude of the first common pixel and the second common pixel. Selecting the at least one common pixel can include automatically selecting the at least one common pixel such that the image processing device makes a selection using an image processing algorithm.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
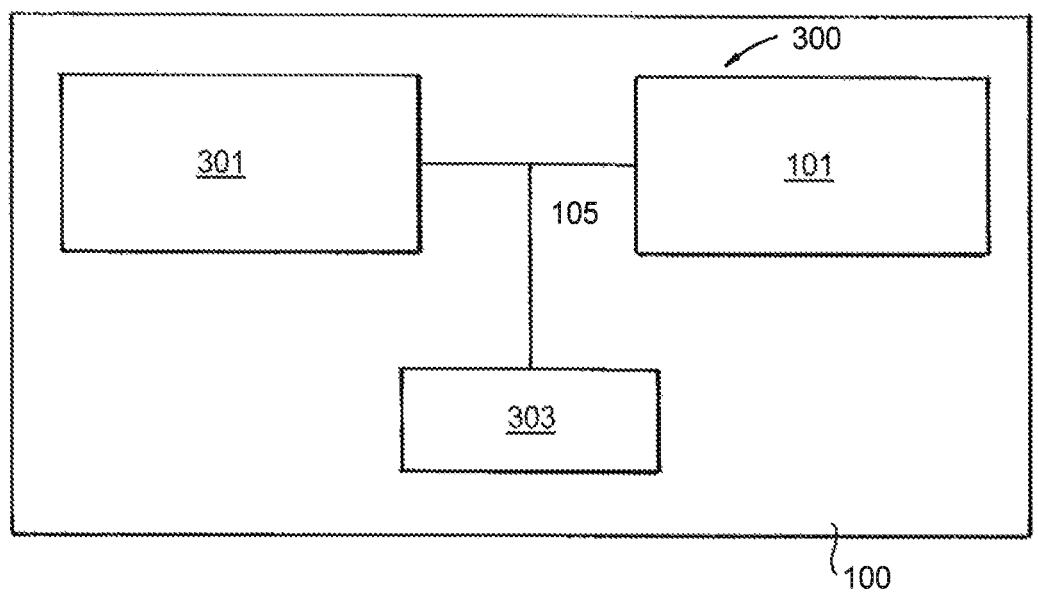
FIG. 1 is a systematic view of a passive altimeter system disposed on an aircraft.

Reference will now be made to the drawings wherein like reference numerals identify similar structural features or aspects of the subject disclosure. For purposes of explanation and illustration, and not limitation, a systematic view of an embodiment of the passive altimeter in accordance with the disclosure is shown in FIG. 1 and is designated generally by reference numeral 300. Other aspects or embodiments of passive altimeters in accordance with this disclosure are shown in FIGS. 2A-3B. The systems and methods described herein can be used to determine altitude above an object and/or ground, or the height of an object and/or portion of terrain without the use of active altimeters.

Referring to FIG. 1, in conjunction with FIGS. 2A-3B, in at least one aspect of this disclosure, a passive altimeter 300 includes an imaging device 101, a groundspeed system 303, and an image processing device 301 configured to receive at least a first image 150 taken at a first position (e.g., FIGS. 2A and 2B) and a second image 250 taken at a second position (e.g., FIGS. 3A and 3B) from the imaging device 101. In some embodiments, the imaging device 101 can include a visual camera and/or an infrared camera, but any suitable imaging apparatus is contemplated. The imaging device 101 can have a known or determinable instantaneous field of view (IFOV) and/or a frame rate. Instantaneous field of view can be different for different axes (e.g., x, y) or directions of view for the imaging device 101, in which case each instantaneous field of view of each axis and direction can be known.

Frame rate, as referred to herein, is the difference in time ($\Delta t$) between the first time of the first image 150 being taken or collected and the second time of the second image 250 being taken or collected. In some embodiments, the imaging device 101 and/or the image processing device 301 are configured to have a preset or selected $\Delta t$ such that images are taken and/or selected at known intervals of time (e.g., every tenth frame recorded by the imaging device 101). The $\Delta t$ can be fast enough to create a significant amount of overlapping area in the first and second images over the desired operational envelope of speed and altitude. A $\Delta t$ compensator can be included that modifies the rate between the first, second image, intervening, and subsequent images such that if the image processing device is not capable of locating a common pixel between the images, the frame rate can change until a common pixel can be found (e.g., at low altitudes, frames closer in time will be used whereas at higher altitudes the frames will have higher overlap. As may be appreciated, images can be taken and analyzed up to the maximum frame rate of the camera. Also, shutter speed and/or exposure time can be reduced to increase the quality of the image if desired.

In some embodiments, the image processing device 301 can include a suitable display configured to display images thereon, but such a display is not necessarily required. The image processing device 301 can include any suitable circuit, processor, computer, and/or other suitable machine configured to receive and process image data from the imaging device 101. The image processing device can also include any suitable data storage disposed therein and/or connected thereto, and can also include any suitable software configured to be used in conjunction with the image processing device.

The image processing device 301 can be configured to compare the first image 150 and the second image 250 to determine an altitude above at least a portion of the terrain depicted in the first image 150 and the second image 250 using an indication of groundspeed (GS) from the groundspeed system 303. To this end, image processing device 301 may be configured to determine an image distance (ID) that the imaging device 101 has traveled between taking the first image and the second image. The image distance between the first image shown in FIG. 2B and the second image shown in FIG. 3B is the horizontal distance the aircraft 100 moved relative to the depicted terrain which can be calculated as a pixel distance.

Figure 2A:
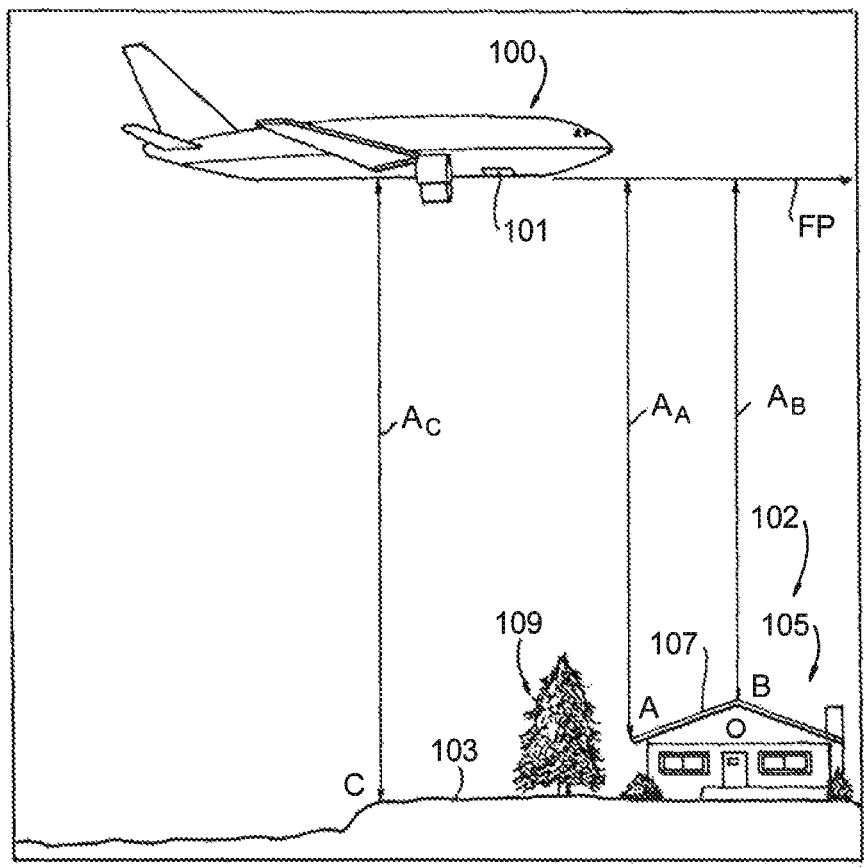
FIG. 2A is side view of an aircraft with an embodiment of a passive altimeter in accordance with this disclosure disposed therein, showing the aircraft in a first position relative to the ground.
Figure 2B:
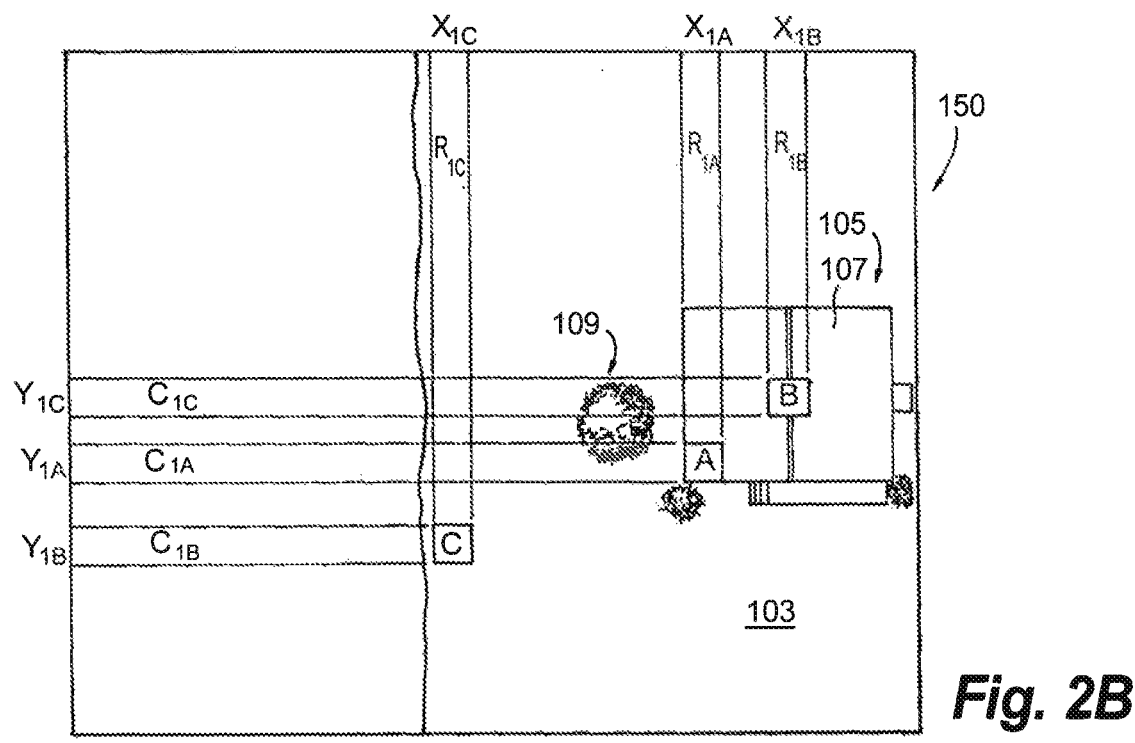
FIG. 2B is a view of an example image of the ground as taken from an imaging device disposed on the aircraft of FIG. 2A.
Figure 3A:
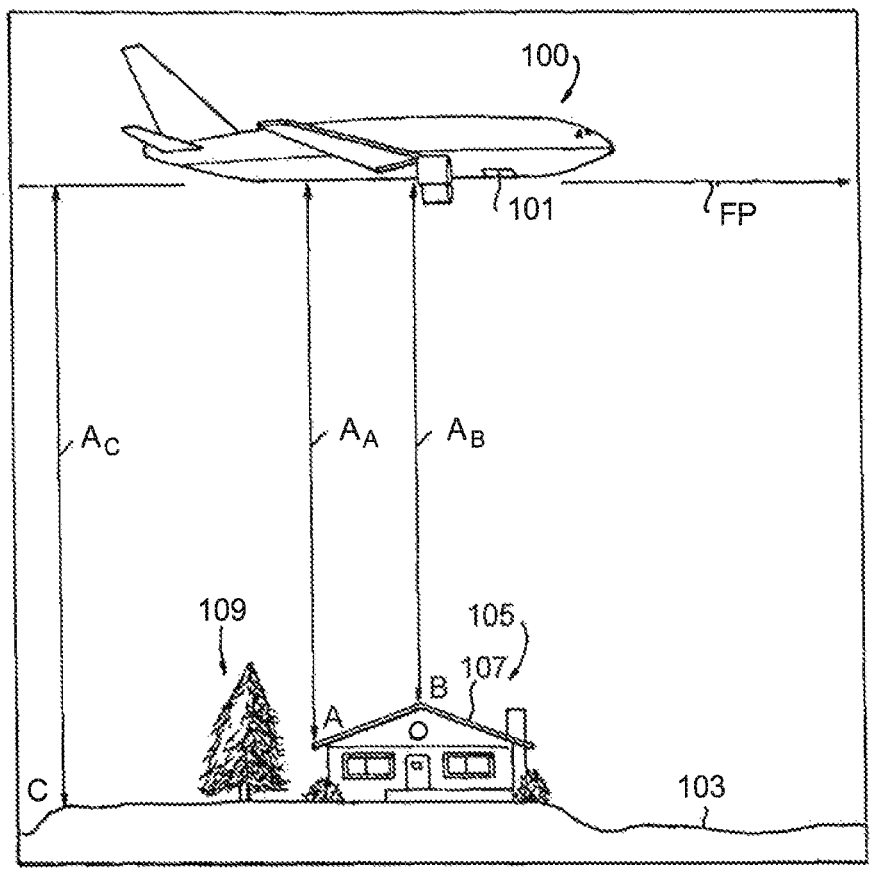
FIG. 3A is side view of an aircraft with an embodiment of a passive altimeter in accordance with this disclosure disposed therein, showing the aircraft in a second position relative to the ground.
Figure 3B:
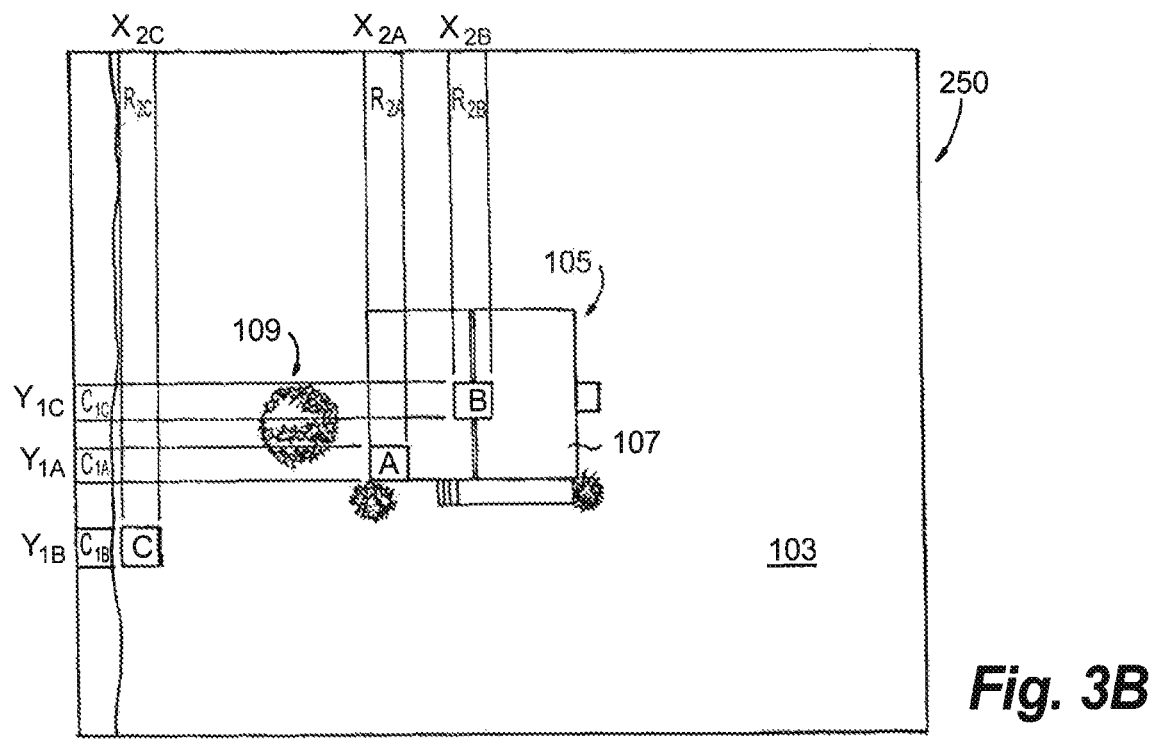
FIG. 3B is a view of an example image of the ground as taken from an imaging device disposed on the aircraft of FIG. 3A.

As an example, three points (points A, B, and C) are shown in FIGS. 2A and 3A as points that can be selected for altitude determination (altitude over these points is shown as $A_A$, $A_B$, and $A_C$, respectively). The image processing device 301 can be further configured to determine a location of at least one common pixel (e.g. pixels A, B, and C in FIGS. 2B and 3B which correspond to points A, B, and C) on the first image 150 and the second image 250. For example, the image processing device 301 can be configured to compare a relative change in position of the at least one common pixel between the first image 150 and the second image 250. As an example, in the first image 105, pixel A (corresponding to point A) has a position of ($X_{1A}$, $Y_{1A}$) and a position of ($X_{2A}$, $Y_{2A}$) in the second image 250. The difference in position of pixel A on the image can be expressed as $\Delta_A=(X_{2A}-X_{1A}), (Y_{2A}-Y_{1A})$. This difference can be manually or automatically determined by any suitable means (e.g., using the image receiving system 301). For example, the image processing device 301 may include a suitable configuration (e.g. physical circuitry, software, and/or the like) to determine coordinates of certain pixels or groups of pixels to determine the relative change or image distance between one or more images. A magnitude of distance can be determined via known means as well.

In another embodiment, a first row position (e.g. $R_{1A}$, $R_{1B}$, $R_{1C}$) and/or a first column position (e.g. $C_{1A}$, $C_{1B}$, $C_{1C}$) can be compared to a second row position (e.g. $R_{2A}$, $R_{2A}$, $R_{2A}$) and/or second column position (e.g. $C_{2A}$, $C_{2B}$, $C_{2C}$) by the image processing device 301 to determine relative change in a similar matter to the point location approach above. In some embodiments, the track of the aircraft 100 is substantially aligned with the columns of the images (e.g. $C_{1A}$, $C_{1B}$, $C_{1C}$), in which case only the rows need to be compared (e.g., comparing $R_{1A}$ to $R_{2A}$) to determine the relative change or image distance.

In some embodiments, the imaging device 101 can be configured to align itself with the groundspeed track such that the columns of the images (e.g. images 150, 250) are always aligned with the direction of travel relative to the ground, thus allowing simpler row based computation of image distance. In some embodiments, rows are essentially in the direction of the roll axis of the aircraft and the imaging device can be configured to compensate for the image motion in the column direction caused by forward motion of the aircraft. This can essentially eliminate a change in column location of objects. To calculate the transformation from the vehicle forward motion to GS, the crab angle between the row axis of the image plane and the direction of flight could be determined. With the row axis of the image plane initially aligned to the aircraft roll axis this crab angle is the crab angle of the aircraft which can be determined from an onboard navigation system or other avionics equipment. This allows for a simpler row bases computation of image distance. The crab angle affect does not need to be included for small crab angles and does not require a highly accurate value.

In some embodiments, the at least one common pixel (e.g. pixel A, B, and/or C) can be tracked manually or automatically by the image processing device 301 or any other suitable system. For example, the image processing device 301 can be configured to read red-green-blue (RGB) values, intensity, and/or similar values of the common pixel (e.g. pixel A, B, and/or C) and/or one or more surrounding pixels of the first image 105 and search for a similar values in a similar pattern in the second image 250. After the image processing device 301 locates the common pixel (e.g. pixel A, B, and/or C) in the second image 250, the image processing device 301 can note the position of the common pixel (e.g. pixel A, B, and/or C) in the second image 250 and subtract this from the position of the common pixel (e.g. pixel A, B, and/or C) in the first image 150.

In some embodiments, the image processing device 301 can be configured to determine or estimate a Nadir angle θ of the focal plane (FP) of the imaging device 101 relative to a ground plane (S-Tilt) and/or an average of Nadir angle of each pixel of the imaging device 101 (P-Tilt). To clarify, S-Tilt is the angle between the focal plane of the imaging device 101 relative to the ground whereas P-Tilt is the angle of the focal plane of one or more pixels of the imaging device 101 relative to a ground plane. The image processing device 301 can be configured to account for a preset Nadir angle (e.g., P-Tilt and/or S-Tilt) of the imaging device 101 based on characteristics of the imaging device 101 and/or how it is mounted (e.g. a FLIR system). In some embodiments, the image processing device 301 can be configured to account for Nadir angles at different flight regimes (e.g. pitch angles) by communicating with one or more aircraft instruments (e.g., an attitude indicator) and/or an aircraft inertial measurement unit. The imaging device 101 can also be gyroscopically or otherwise stabilized to maintain a minimized Nadir angle θ relative to the ground or a fixed point. For example, the imaging device 101 can be configured to account for movement of aircraft 100 or for misalignment with the fuselage relative to the ground.

While S-Tilt can be accounted for quite easily by determining the tilt angle of the entire imaging device 101, P-Tilt can be accounted for by calculating the average pixel location angle relative to the center of the image plane by determining the average pixel location using the relationship $APL=((X_{1A}+X_{2A})/2, (Y_{1A}+Y_{2A})/2)$.

In some embodiments, the image processing device 301 can be configured to assume a Nadir angle θ of zero when determining the altitude. For example, in certain flight regimes and circumstances, the Nadir angle θ (e.g., including P-Tilt and/or S-Tilt) is sufficiently small that it has limited effect on calculation of altitude (e.g. straight and level flight, images taken in short intervals, and the like). Also, the image processing device 301 can be configured to average Nadir angles of separate images to create a single Nadir angle for ease of calculation.

The groundspeed indicator system 303 can include a global positioning system (GPS) and/or an aircraft inertial measurement unit configured to provide the image processing device 301 with a groundspeed. For example, a GPS can be used for substantially constant speed travel, and the inertial measurement unit can provide real time speed change data using one or more accelerometers and/or other aircraft instrumentation (e.g., barometric altimeter, heading indicator, attitude indicator, or the like) to create an accurate quantification of groundspeed even in variable speed and/or orientation scenarios where GPS cannot provide accurate speed change information fast enough, for example.

The image processing device 301 is configured to utilize the information provided by multiple images (e.g. images 150, 250) and the groundspeed indicator to determine altitude over a desired point. The image processing device 301 can be configured to calculate altitude above ground or an object on the ground (AGL) based on the following relationship:

$$AGL=[(GS*\Delta t)/(IFOV*ID)]*\cos(\theta),$$

where θ is Nadir angle (e.g., P-Tilt and/or S-Tilt), $IFOV*ID=[(IFOVX*ID_X)^2+(IFOVy*ID_Y)^2]^{1/2}$, where $ID_X=|X_{1A}-X_{2A}|$ and $ID_Y=|Y_{1A}-Y_{2A}|$. If θ includes P-Tilt, P-Tilt can be calculated as off axis angle of pixel $(X_{avgA}, Y_{avgA})$, where $X_{avgA}=(X_{1A}+X_{2A})/2$ and $Y_{avgA}=(Y_{1A}+Y_{2A})/2$.

In at least one aspect of this disclosure, a method for passively determining altitude can include providing an imaging device 101 having a known instantaneous field of view as disclosed herein, a groundspeed indicator 303 configured to determine a groundspeed of an aircraft, and an image processing device 301 configured to receive at least a first image (e.g., image 150) at a first position and a second image (e.g., image 250) at a second position from the imaging device 101.

The method can further include receiving, at the image processing device 301, the first image 150 from the imaging device 101 and receiving, at the image processing device 301, the second image 250 from the imaging device 101.

The method can also include determining a Δt as the difference in time between taking and/or collecting the first image and the second image. The method can also include setting the Δt to a predetermined time difference or otherwise as disclosed herein.

In some embodiments, the method further includes selecting at least one common pixel (e.g. pixel A, B, and/or C) between the first image 150 and the second image 250 either manually or automatically as described herein. For example, the selecting step can be performed automatically by the image processing device 301. The method can also further include determining a relative change in position of the at least one common pixel between the first image and the second image to determine an image distance as disclosed herein and calculating altitude above a portion of a surface depicted by the at least one common pixel using the relationships disclosed herein. The method can further include determining the Nadir angle θ, or assuming it to be zero.

In some embodiments, the method can further include determining the altitude of a structure relative to ground that is depicted in the first image 150 and the second image 250 by determining a difference in altitude of the point (e.g. point B) depicted in the first common pixel (e.g. pixel B) and the point (e.g. point C) depicted in the second common pixel (e.g. pixel C).

The method can further include creating an altitude map of an area using the systems and methods above to determine altitude of a suitable plurality of points on a series of images. This can allow a passive altimeter to be used to map an area of unknown altitudes and/or to allow surveillance of an area for change of altitude (e.g. construction, destruction, terrain changes). The methods disclosed herein can be implemented into any suitable software or hardware and performed by a computer or other suitable machine such that the methods may be automated and the calculations of altitude can be automatic and/or quick for real time altitude analysis.

The methods and systems of the present disclosure as disclosed herein provide for a passive altimeter. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A method for passively determining altitude, comprising:
    receiving, at an image processing device, a first image from an imaging device, the imaging device having a known instantaneous field of view (IFOV);
    receiving, at the image processing device, a second image from the imaging device;
    receiving a groundspeed indication from a groundspeed system that is configured to determine a groundspeed (GS) of an aircraft;
    determining a Δt as a difference between in time between the first image and the second image;

selecting at least one common pixel of the first image and the second image;

determining a relative change in position of the at least one common pixel between the first image and the second image to determine an image distance (ID); and calculating altitude above ground level (AGL) above a portion of a surface depicted by the at least one common pixel using the following relationship: AGL=[(GS*Δt)/(IFOV*ID)]*cos (θ), wherein θ is a Nadir angle.

2. The method of claim 1, wherein calculating above ground altitude (AGL) includes determining the Nadir angle with the image processing device.

3. The method of claim 1, wherein calculating above ground altitude (AGL) includes assuming the Nadir angle is zero.

4. The method of claim 1, wherein determining the Δt includes receiving the Δt as a predetermined value selected by a user.

5. The method of claim 1, wherein the step of selecting the at least one common pixel further includes selecting a first common pixel depicting a portion of a structure and a second common pixel depicting a portion of ground, the method further including determining the altitude of a structure relative to ground that is depicted in the first and second images by determining a difference in altitude of the first common pixel and the second common pixel.

6. The method of claim 1, wherein the step of selecting the at least one common pixel includes automatically selecting the at least one common pixel, wherein the image processing device makes a selection using an image processing algorithm.

\* \* \* \* \*